Patented Aug. 19, 1952

2,607,753

UNITED STATES PATENT OFFICE 2,607,753

COAGULATION OF SYNTHETIC RUBBER LATICES

James W. Adams, Seymour, Conn., assignor to United States Rubber Company, New York, N. Y., a corporation of New Jersey No Drawing. Application May 23, 1950, Serial No. 163,789

6 Claims. (Cl. 260—41)

This invention relates to improvements in the coagulation of synthetic rubber latices.

Synthetic rubber latices, as is known, may be prepared by the aqueous emulsion polymerization of butadienes-1,3 or mixtures of butadienes-1,3 with other polymerizable compounds capable of forming copolymers with butadienes-1,3. In practice, the synthetic rubber-forming monomers are emulsified in water with anionic surface-active agents and the emulsion is polymerized in the presence of a conventional catalyst and regulator. The monomers, such as butadiene-1,3 and styrene in conventional GR-S latex preparation, are polymerized to the desired extent, and the reaction is stopped by addition of a polymerization inhibitor or shortstopper, after which residual unreacted monomers are removed from the latex by venting gaseous monomers and by steam distillation under reduced pressure of higher boiling monomers. The thus formed latex may be flocculated by mixing with conventional aqueous solution of salt and/or acid coagulating agents, such as mixing with solutions of polyvalent metal salts, e. g. calcium chloride, aluminum sulfate, zinc sulfate, or solutions of acids such as sulfuric, hydrochloric, acetic or formic acid, or solutions of mixtures thereof, or solutions of mixtures of such acids with alkali salts, e. g. sodium chloride, or by mixing with separate solutions of any of the above, as in the conventional two step flocculation where the latex is first mixed with an aqueous solution of sodium chloride to thicken or "cream" the latex, and then is mixed with an aqueous solution of sulfuric acid to coagulate the latex into readily filterable rubber flocs. The amount of such flocculating agents used will vary over a wide range. Acids and polyvalent-metal salt coagulants, as known, may be used in amounts from about 1% to about 20% based on the rubber in the latex, the amount in any given case depending on the particular coagulant used and the amount of protective in the latex to be flocculated. The amount of alkali salt, when used, may be up to about 25% based on the rubber in the latex.

Where water-soluble soaps of soap-forming monocarboxylic acids, such as the alkali salts of higher fatty acids, rosin acids, or naphthenic acids are the anionic surface-active agents used to emulsify the polymerizable monomers, the latices may readily be flocculated with the various conventional salt and/or acid coagulants to give a clear serum free from uncoagulated particles or fines which would remain suspended in the filtrate and represent a loss of rubber material. In some synthetic rubber formulations or recipes, it is desirable to add an auxiliary stabilizer in order to prevent possible preflocculation in the reactor or in other steps of the process prior to the final coagulation. Such auxiliary stabilizers are other well-known anionic surface-active agents than the monocarboxylic acid soaps, and are sulfates and sulfonates of organic compounds containing at least one group having more than 8 carbon atoms. However, such auxiliary stabilizers are at best only partially deactivated by the conventional salt and/or acid coagulants for the latex and cause appreciable amounts of fines after conventional flocculation of the latex, with loss of such fines in the filtrate on separation of the rubber flocs. Further, such organic sulfate and sulfonate surface-active agents are generally used to disperse carbon black in water before mixing with synthetic rubber latex and flocculating the latex-carbon black mixture to form so-called rubber-carbon black master batches. In such cases, even larger amounts of these organic sulfate and sulfonate surface-active agents are present, causing even greater loss in fines in the filtrate from the rubber-carbon black floc separation.

The object of the present invention is to reduce as far as possible the loss in fines on flocculation of synthetic rubber latices (including compounded latices, such as latex-carbon black mixtures) containing sulfate or sulfonate surface-active dispersing agents.

There is described in U. S. patents to Ogilby 2,359,667 and Uhlig 2,359,698 the flocculation or coagulation of a latex containing an organic sulfate or sulfonate surface-active agent with acid in the presence of a polyethylene polyamine to aid in the flocculation or coagulation. In all cases, the actual flocculation or coagulation of the latex was made to take place in the presence of the polyethylene polyamine, the latex being uncoagulated in the absence of the polyethylene polyamine. I have found that if a synthetic rubber latex, or synthetic rubber latex-carbon black mix, which contains an organic sulfate or sulfonate surface-active agent, is first flocculated with the conventional salt and/or acid coagulant, and thereafter a polyethylene polyamine is mixed into the flocculated bath, the loss in fines in the filtrate from the floc separation will be very much less than if the polyethylene polyamine were present in the system at the time of flocculation, as by being added to the latex, or to the coagulating bath, before being mixed to cause flocculation.

In carrying out the present invention, the synthetic rubber latex, which may be compounded with carbon black, clay, or other compounding ingredients, and which contains sulfate or sulfonate surface-active agent is flocculated with conventional salt and/or acid flocculant, and thereafter the polyethylene polyamine is mixed with the resulting flocculated mixture.

The amount of alkali soap of soap-forming monocarboxylic acid used as an emulsifying agent for the polymerizable monomers in preparing synthetic rubber latex, is generally from 3% to 6% based on the polymerizable monomers. All percentages and parts used herein are by weight. The amount of auxiliary sulfate or sulfonate surface-active dispersing agent for the polymerizable monomers used in preparing the synthetic rubber latex, may be from 0.05% to 1% based on the polymerizable monomers. The conversion of monomers to polymer will generally be about 50% to 85%. The amount of sulfate or sulfonate surface-active agent used to disperse carbon black in water prior to mixing with the latex will generally be about 1% to 5% based on the carbon black. The ratio of carbon black to rubber, when a carbon black slurry is mixed with the latex to prepare a so-called master batch, is in the range of 40 to 100 parts of carbon black per 100 parts of rubber of the latex, preferably 50 to 60 parts of carbon black per 100 parts of rubber of the latex. The content of alkali soap of soap-forming monocarboxylic acid in the latex to be flocculated will thus generally be from 3% to 10% based on the rubber of the latex. The content of sulfate or sulfonate surface-active agent in the latex will thus generally be from 0.05% based on the rubber where the latex does not contain carbon black to 6% based on the rubber where the latex is compounded with large amounts, around equal parts, of carbon black.

The polymerizable material in the preparation of the synthetic rubber latex may be one or a mixture of butadienes-1,3, for example, butadiene-1,3, methyl-2-butadiene-1,3 (isoprene), chloro-2-butadiene-1,3 (chloroprene), piperylene, 2,3-dimethyl butadiene-1,3. The polymerizable material, as is known, may be a mixture of one or more such butadienes with one or more polymerizable compounds which are capable of forming rubber copolymers with butadienes-1,3; for example, up to 70% of such mixture of one or more compounds which contain a single $CH_2=C<$ group where at least one of the disconnected valences is attached to an electro-negative group, that is, a group which substantially increases the electrical dissymmetry or polar character of the molecule. Examples of such monoolefines containing a terminal methylene ($CH_2=C<$) group which are copolymerizable with butadienes-1,3, are aryl olefines, such as styrene, vinyl naphthylene; alpha methyl styrene, parachloro styrene, dichloro styrene; the alpha methylene carboxylic acids and their esters, nitriles and amides, such as acrylic acid, methyl acrylate, methyl methacrylate, acrylonitrile, methacrylonitrile, methacrylamide; methyl vinyl ether, methyl vinyl ketone; vinylidene chloride.

The water-soluble soaps of soap-forming monocarboxylic acids used as emulsifying agents for the polymerizable monomers are alkali salts of aliphatic acids having chains of 8 to 24 carbon atoms in the molecule, for example, caprylic, pelargonic, capric, lauric, palmitic, stearic, oleic acids, alkali salts of naphthenic acids, and alkali salts of rosin acids, including hydrogenated, dehydrogenated, and disproportionated rosin acids, such as alkali salts of abietic acid, dehydroabietic acid, dihydroabietic acid, tetrahydroabietic acid, and mixtures of the same. The term "alkali salts" (or soaps) is used herein in its conventional sense as including alkali-metal, ammonium, and substituted ammonium (amine) salts, but excluding alkali earth and other polyvalent metal salts.

The sulfate and sulfonate surface-active agents which may be used as auxiliary dispersing agents in the preparation of the synthetic rubber latex, and which may be used to disperse carbon black in water to mix with the latex, are those having a general formula $R-SO_3M$, where M represents alkali, that is, alkali metal, ammonium or substituted ammonium (amine) radical, and R represents an organic radical containing at least one group having more than 8 carbon atoms, and generally not more than 24 carbon atoms. Examples of such anionic surface-active agents are:

(1) Alkyl sulfonates (e. g. dodecyl sodium sulfonate, cetyl potassium sulfonate).

(2) Alkyl sulfates (e. g. sodium dodecyl sulfate, sodium oleyl sulfate).

(3) Sulfonated ethers of long and short chain aliphatic groups (e. g.

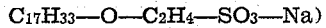

(4) Sulfated ethers of long and short chain aliphatic groups (e. g.

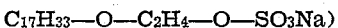

(5) Sulfonated alkyl esters of long chain fatty acids

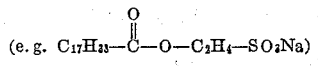

(6) Sulfonated glycol esters of long chain fatty acids

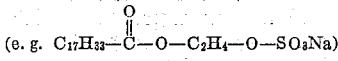

(7) Sulfonated alkyl substituted amids of long chain fatty acids

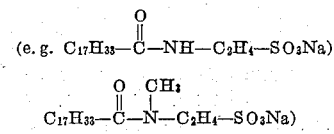

(8) Alkylated aryl sulfonates (e. g. isopropyl naphthalene sodium sulfonate, dodecyl benzene sodium sulfonate).

(9) Hydroaromatic sulfonates (e. g. tetrahydronaphthalene sodium sulfonate).

(10) Alkyl sulfosuccinates (e. g. dioctyl sodium sulfosuccinate).

(11) Aryl sulfonate-formaldehyde condensation products (e. g. condensation product of formaldehyde and sodium naphthalene sulfonate,

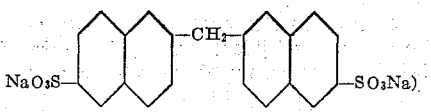

The polyethylene polyamines used in the present invention are well known materials, the simplest compound effective in the present invention being diethylene triamine. Ethylene diamine does not reduce the loss in fines. Other effective compounds in the present invention are triethylene tetramine, tetraethylene pentamine, pentaethylene hexamine, heptaethylene octamine, nonaethylene decamine, decaethylene undecylamine, and higher polyethylene polyamines, including mixtures thereof, up to polyethylene polyamines having average molecular weights of 1000 and over.

The following examples illustrate the invention:

Example I

An aqueous emulsion of butadiene-1,3 and styrene was prepared according to the following formulation:

| | Parts |
|---|---|
| Butadiene | 71.5 |
| Styrene | 28.5 |
| Water | 215 |
| Cumene hydroperoxide | 0.12 |
| Mixed tertiary mercaptans | 0.24 |
| Potassium salt of disproportionated rosin acid | 4.0 |
| Sodium salt of condensation product of formaldehyde and naphthalene sulfonic acid | 0.1 |
| Trisodium phosphate, dodecahydrate | 0.3 |
| Ferrous sulfate, heptahydrate | 0.18 |
| Potassium pyrophosphate | 0.2 |

The above formulation is the conventional type of so-called "sugar-free" formulation for GR–S polymerizations at low temperatures (41° F.). The mixed tertiary mercaptans comprised 60% tertiary dodecyl mercaptan, 20% of tertiary tetradecyl mercaptan, and 20% of tertiary hexadecyl mercaptan, and is used as a regulator; the potassium soap of disproportionated rosin acid is the primary emulsifier; the sodium salt of the condensation product of formaldehyde and naphthalene sulfonic acid is the auxiliary surface-active dispersing agent; the trisodium phosphate is a buffer; the cumene hydroperoxide is a typical organic peroxygen catalyst; and the sodium pyrophosphate and the ferrous sulfate are activators for the cumene hydroperoxide catalyst. Polymerization was carried out at 41° F. for about 14 hours, to 60% conversion of polymerizable monomers, after which the polymerization was stopped by adding 0.23 part of dinitrochlorobenzene dissolved in styrene (5% solution). Unreacted butadiene was vented off and unreacted styrene was removed by steam distillation under reduced pressure. 1.5 parts of an antioxidant (condensation product of diphenylamine and acetone) was added to the latex in the form of an aqueous emulsion. The final synthetic rubber latex had a 21% solids concentration.

Several portions of a carbon black dispersion were prepared by mixing 50 parts of a high abrasion furnace (HAF) carbon black in 200 parts of water in the presence of .2 part of sodium hydroxide and 1.5 parts of the sodium salt of the condensation product of formaldehyde and naphthalene sulfonic acid as the dispersing agent under conditions of violent agitation.

Four portions of the carbon black dispersion containing 50 parts of carbon black were mixed with four portions of the GR–S latex prepared as above containing 100 parts of synthetic rubber giving a ratio of carbon black to rubber of 1 to 2. The first latex-carbon black mixture was flocculated by mixing it with a flocculating bath containing 500 parts of water, 12 parts of sodium chloride, and 2 parts of sulfuric acid. After flocculation, the latex was filtered through a 54-mesh screen, and the loss in fines in the filtrate was determined. The loss in fines amounted to 11.5% of the recovered rubber-carbon black master batch. In a second flocculation, 0.125 part of tetraethylene pentamine was added to the sodium chloride-sulfuric acid flocculating solution. In this case the loss of fines in the filtrate was 4.2% of the recovered rubber-carbon black master batch. In a third flocculation, 0.125 part of tetraethylene pentamine was added to the latex before flocculation. In this case, the loss of fines in the filtrate was 2.2% of the recovered rubber-carbon black master batch. In a fourth flocculation according to the present invention, 0.125 part of tetraethylene pentamine was added to the flocculated latex, that is, after the latex has been poured into the sodium chloride sulfuric acid flocculating bath. In this case, the loss in fines was only 0.7% of the recovered rubber-carbon black mix, as compared to the 4.2% and 2.2% where the polyethylene polyamine was present in the system at the time of flocculation of the latex.

Example II

A synthetic rubber GR–S latex prepared as in Example I was flocculated by first thickening or creaming by mixing with an aqueous solution containing 12% of sodium chloride based on the rubber content of the latex followed by mixing therewith an aqueous solution containing 2% sulfuric acid based on the rubber content of the latex. On filtering, the filtrate was cloudy showing the presence of suspended material or fines in the serum which were not recovered in the filtering procedure. The amount of such fines represented about 10% of the original rubber contained in the latex. Acetic acid solutions of various polyethylene polyamines were used to titrate portions of the cloudy serum from the flocculated latex until the suspended fines flocculated to give a clear serum.

The amount of diethylene triamine

to give a clear serum was 0.03% based on the rubber. The amount of triethylene tetramine

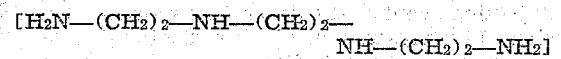

to give a clear serum was 0.008%. The amount of tetraethylene pentamine to flocculate the fines was 0.002%. The amount of a mixture of polyethylene polyamines from tetraethylene pentamine to decaethylene undecylamine, and predominantly pentaethylene hexamine and hexamethylene heptamine, to flocculate the fines was 0.033%. The amount of a mixture of high molecular weight of polyethylene polyamines having an average molecular weight about 1200 to flocculate the fines was 0.002%. Ethylene diamine [NH$_2$—(CH$_2$)$_2$—NH$_2$] would not clear the serum.

Where 0.003% of tetraethylene pentamine was added to the flocculating solution of sodium chloride and sulfuric acid before flocculation of the latex, the filtrate still remained cloudy showing that one and one-half times the minimum amount which would clear the filtrate when added after flocculation would not clear the filtrate where the flocculation was made to take place in the presence of the tetraethylene pentamine.

In general, the amount of polyethylene polyamine need be only a fraction of the sulfate or sulfonate surface-active agent. Relatively larger amounts, based on the rubber, are necessary to clarify filtrates from straight latex flocculation than in the case of latex-carbon black mixtures. However, the over-all range of polyethylene polyamine may be from 0.5% to 35% of the sulfate or sulfonate surface-active agent. As shown above, latex containing 0.15 part of the sodium salt of the condensation product of formaldehyde and naphthalene sulfonic acid based on the rubber was cleared with 0.002% of tetraethylene pentamine based on the rubber. Where the latex contained 0.2 and 0.4 part of the sodium salt of the condensation product of formaldehyde and naphthalene sulfonic acid, the serums of the flocculates were cleared by the addition of 0.012% and 0.020% respectively, of tetraethylene pentamine based on the rubber.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. The method of coagulating a butadiene polymer synthetic rubber latex containing up to 100 parts of carbon black per 100 parts of synthetic rubber content and containing a surface-active dispersing agent of the general formula R—$SO_3$M where M represents an alkali radical and R represents an organic radical containing at least one group having more than 8 carbon atoms, which comprises mixing with the latex in the absence of polyethylene polyamines water-soluble material of the group consisting of acids, polyvalent metal salts, acids and polyvalent metal salts, and acids and alkali salts, in amount to cause flocculation of the latex and thereby flocculating the latex, and thereafter adding to the resulting flocculated mixture a polyethylene polyamine.

2. The method of coagulating a butadiene polymer synthetic rubber latex containing up to 100 parts of carbon black per 100 parts of synthetic rubber content and containing a surface-active dispersing agent of the general formula R—$SO_3$M where M represents an alkali radical and R represents an organic radical containing at least one group having more than 8 carbon atoms, which comprises mixing with the latex in the absence of polyethylene polyamines sodium chloride and sulfuric acid, in amount to cause flocculation of the latex and thereby flocculating the latex, and thereafter adding to the resulting flocculated mixture a polyethylene polyamine.

3. The method of coagulating a synthetic rubber latex comprising an aqueous emulsion polymerizate of a mixture of a butadiene-1,3 and a compound which contains a single $CH_2$=C< group and is copolymerizable with butadienes-1,3, said latex containing a surface-active dispersing agent of the general formula R—$SO_3$M where M represents an alkali radical and R represents an organic radical containing at least one group having more than 8 carbon atoms, which comprises mixing with the latex in the absence of polyethylene polyamines water-soluble material of the group consisting of acids, polyvalent metal salts, acids and polyvalent metal salts, and acids and alkali salts, in amount to cause flocculation of the latex and thereby flocculating the latex, and thereafter adding to the resulting flocculated mixture a polyethylene polyamine.

4. The method of coagulating a synthetic rubber latex comprising an aqueous emulsion polymerizate of a mixture of a butadiene-1,3 and a compound which contains a single $CH_2$=C< group and is copolymerizable with butadienes-1,3, said latex containing a surface-active dispersing agent of the general formula R—$SO_3$M where M represents an alkali radical and R represents an organic radical containing at least one group having more than 8 carbon atoms, which comprises mixing with the latex in the absence of polyethylene polyamines sodium chloride and sulfuric acid, in amount to cause flocculation of the latex and thereby flocculating the latex, and thereafter adding to the resulting flocculated mixture a polyethylene polyamine.

5. The method of coagulating a synthetic rubber latex comprising an aqueous emulsion polymerizate of a mixture of butadiene-1,3 and styrene, said latex containing up to 100 parts of carbon black per 100 parts of synthetic rubber content and containing a surface-active dispersing agent of the general formula R—$SO_3$M where M represents an alkali radical and R represents an organic radical containing at least one group having more than 8 carbon atoms, which comprises mixing with the latex in the absence of polyethylene polyamines water-soluble material of the group consisting of acids, polyvalent metal salts, acids and polyvalent metal salts, and acids and alkali salts, in amount to cause flocculation of the latex and thereby flocculating the latex, and thereafter adding to the resulting flocculated mixture a polyethylene polyamine.

6. The method of coagulating a synthetic rubber latex comprising an aqueous emulsion polymerizate of a mixture of butadiene-1,3 and styrene, said latex containing up to 100 parts of carbon black per 100 parts of synthetic rubber content and containing a surface-active dispersing agent of the general formula R—$SO_3$M where M represents an alkali radical and R represents an organic radical containing at least one group having more than 8 carbon atoms, which comprises mixing with the latex in the absence of polyethylene polyamines sodium chloride and sulfuric acid, in amount to cause flocculation of the latex and thereby flocculating the latex, and thereafter adding to the resulting flocculated mixture a polyethylene polyamine.

JAMES W. ADAMS.

REFERENCES CITED

The following references are of record in the file of this patent:

UNITED STATES PATENTS

| Number | Name | Date |
|---|---|---|
| 2,359,667 | Ogilby | Oct. 3, 1944 |
| 2,419,512 | Vesce | Apr. 22, 1947 |